United States Patent Office 2,879,036
Patented Mar. 24, 1959

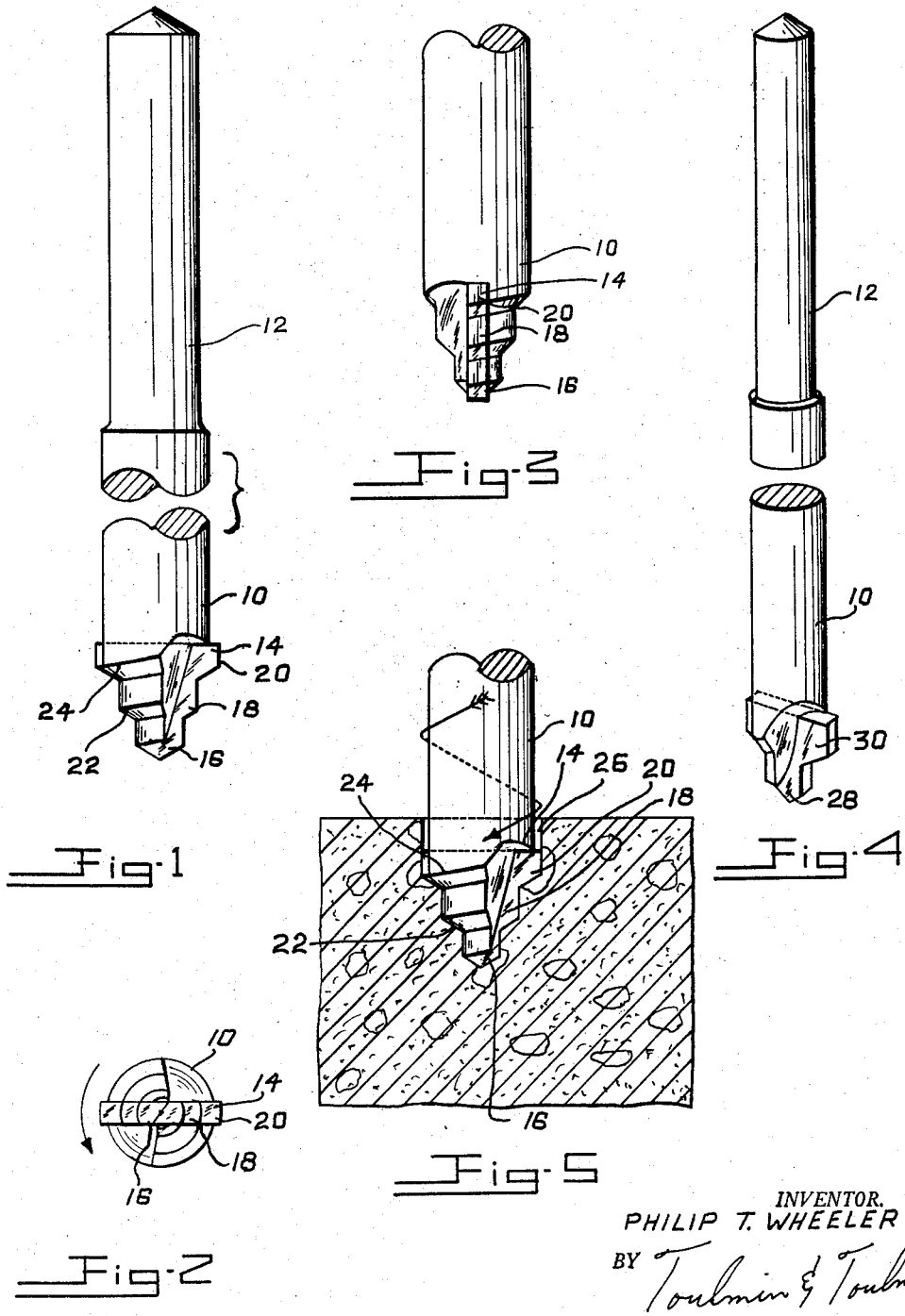

2,879,036

MASONRY DRILL

Philip T. Wheeler, Oxford, Ohio

Application June 25, 1956, Serial No. 593,524

1 Claim. (Cl. 255—61)

This invention relates to a masonry drill for drilling masonry and stone, and like materials, particularly concrete, cement and cinder block, and the like, utilizing such a drill.

Heretofore, in the art of drilling holes in masonry and the like a great deal of difficulty has been experienced in achieving a straight, clean hole. This comes about because of the chattering of the drill against the material being cut and lateral deflection of the drill as it encounters hard spots such as pebbles or bits of broken or crushed stone. There is reason to believe that the basic cutting principles upon which conventional drills for masonry are founded make straight, clean holes impossible to achieve.

Having the foregoing particularly in mind, and applying new basic cutting principles to solve the problem, an object of the present invention is the provision of a bit or drill especially devised for drilling straight, clean holes in concrete block, cinder block, and similar masonry.

Another object is the provision of a relatively inexpensive drill of the nature referred to which can readily be utilized for drilling straight, accurate, and clean holes in masonry.

Another object of the present invention is the provision of a masonry drill in which reduced thrust is required for accomplishing the drilling.

It is also an object of the present invention to provide a masonry drill in which the drill is not deflected by hard spots that may be encountered thereby, but, instead is so supported that the hard spots are drilled through whereby a clean, straight hole always results.

A still further object is the provision of a masonry drill which is easy to start in a precise location and which, once started, will continue in a straight line in the direction of thrust, without deflection.

A still further object is the provision of a drill for masonry which will run cooler than conventional drills utilized for the same purpose, and the provision of a drill for masonry which will not become dull as rapidly as conventional drills utilized for the same purpose.

The foregoing objects, as well as still other objects and advantages of the present invention, become more evident on reference to the following specification taken in connection with the accompanying drawings, in which:

Figure 1 is a side elevational view of a drill constructed according to my invention;

Figure 2 is a view looking in the end of the drill of Figure 1;

Figure 3 is a view looking at the drill from the side of Figure 1;

Figure 4 is a perspective view showing a drill according to my invention of a different size than the drill of Figures 1–3; and Figure 5 is a view showing the drill of Figure 1 drilling a hole in masonry.

Referring to the drawings somewhat more in detail, the drill in Figure 1 comprises body part 10 which may have a shank portion 12 of any suitable description for being clamped in a chuck or other clamping device, or the shank may be tapered for being received in a tapered holder. The end of the body part 10 opposite the shank carries a transversely extending flat blade part 14, which is of an extremely hard material such as tungsten carbide. The flat blade-like member 14 is advantageously mounted in a slot provided therefor in the end of the body part 10 of the drill, and is permanently fixed in place as by brazing or some similar joining operation that will result in a substantially integral bond between parts 10 and 14, and which bond is also substantially insensitive to temperatures that will be encountered in utilizing the drill.

One manner in which the drill can be manufactured is to take an ordinary twist drill and slot the end thereof, and place the blade 14 in position as described. However, since the body portion 10 of the drill is primarily a supporting element, it can be fluted in any one of several conventional manners sufficient to accomplish adequate chip clearance and support.

According to the present invention, the blade 14 is provided with a small end part 16 which will serve as a starting drill and as a pilot, and one or more shoulder portions as at 18 and 20, each of which consists of an axial side part and an inclined lower surface. The lower surface of each of the shoulders 18 and 20 is ground so as to have some relief as is indicated by the lines at 22 and 24; and, in this manner, the drill may be advanced into the work as the cutting thereof proceeds.

The grinding of the blade portion 14 is accomplished after it is mounted in the body portion of the drill, whereby the proper clearance will be provided around the body portion, again as indicated by lines 22 and 24. The axial portion of the drill in back of the shouldered parts of blade 14 are also ground so as to be of a diameter corresponding to that shoulder of the blade 14 to which they are adjacent; and, in this manner, there is provided a support extending rearwardly around the drill behind each shoulder of the blade which will serve not only to strengthen the drill, but also provides a bearing against the sides of the hole being formed by each cutting facet that assists in preventing the drill from being deflected laterally in the hole due to variations in the hardness of the material being drilled.

It is to be observed that the blade 14 extends out beyond the body portion 10 on both sides so that there is clearance between the body portion 10 and the sides of the hole, as indicated at 26 in Figure 5, whereby substantially the only frictional resistance to rotation of the drill occurs because of the engagement of the cutting edges thereof, with the surface of the hole being cut thereby.

I have found by test and experiment that drills constructed in the manner described will drill straight true holes in masonry such as concrete, cement or cinder blocks, and will drill straight through pebbles and pieces of stone, instead of being deflected thereby. Due to the fact that the drill runs straight and cuts a true hole, less material must be removed by the drill, and a greater efficiency of operation thereby obtains. Further, a drill of a predetermined size will form a hole in the masonry of the same size, and this enables holes to be provided of the proper size for lead inserts, and the like; and, with the assurance that these inserts will be firmly bonded in the hole provided therefor, since the hole has straight axial sides instead of the usual bell-mouthed characteristics that obtain from the use of an ordinary masonry drill.

The tests and experiments which I have made indicate that the portion 16 of the drill should be around a 1/8" to 3/16" in diameter, and that each shoulder should be in the nature of from 3/32" to 3/16"; but, it will be understood that the particular sizes of these parts of the drill are subject to variations to meet changing conditions.

In small drill size, for example, 1/4" or 3/8", it is sufficient for the blade to have a pilot end part and one shoulder as is shown in Figure 4, wherein the pilot part 28 and single shoulder portion 30 comprise the entire cutting portion of the drill.

The drill of Figures 1, 2 and 3 is taken from a ½" size drill, for it is believed that the combination of a pilot end and two shoulders would probably suffice for drills up to 1" with three or four shoulders being provided for drills larger than an inch, and, on occasion, down to ¾".

In any case, the cutting end of the drill is split up into a plurality of different cutting surfaces which gives the drill a chance to dissipate and distribute the heat generated therein more uniformly and more rapidly than could be accomplished in a drill with a single, continuous edge. Further, the drill according to the present invention comprises an extended piloting surface area associated with the pilot end, and with the end portions of the body of the drill located behind the various shoulders of the cutting blade whereby deflecting of the drill is practically eliminated.

The drill, according to the present invention is economical, since the extremely hard cutting element that does the actual work is quite small and is joined to a larger body part which can be made of much more inexpensive material, while still retaining sufficient strength and providing proper support for the hard cutting blade.

A particular advantage that obtains in connection with my invention is that it is possible to drill holes quite close to a surface of a piece of masonry wherein the surface is parallel or substantially parallel to the direction of drilling.

Heretofore, due to the inherent low-tensile strength of masonry materials, it has not been possible to accomplish this, because even a small deflection of a drill would be sufficient to impose a breaking load on the thin wall at the one side of the hole and to break this wall out.

With a drill, according to the present invention, the drill is not deflected and cuts a straight, true hole; and, there are no such breaking loads imposed on the thin wall at the side of the hole, and satisfactory bores can thus be located in blocks and the like much closer to the edge than has heretofore been possible.

It has been contemplated that the blade-like member is advantageously formed of tungsten carbide, but it will be understood that the present invention contemplates utilizing any material sufficiently hard to effect the proper cutting action on the materials to be operated. Thus, it might not be necessary to employ material as expensive as tungsten carbide for drilling cinder blocks or a masonry mixture in which there was no coarse aggregate.

Accordingly, it will be understood that it is not intended that the present invention will be limited solely to the use of tungsten carbide for the cutting element.

It will be understood that this invention is susceptible to modification in order to adapt it to different usages and conditions; and, accordingly, it is desired to comprehend such modifications within this invention as may fall within the scope of the appended claim.

I claim:

In a masonry drill; a rod-like holder element, a transverse slot in the end of said element, a unitary flat tungsten carbide blade fitted into said slot and bonded to said holder element to form an integral unit therewith, said carbide blade having a point thereon on the end opposite the holder element and being formed along both sides in a series of outwardly extending shoulders to a terminal base portion that is wider than the diameter of said holder element, each such shoulder being inclined upwardly away from the point of the blade, each side of the blade between the shoulders being parallel with the axis of the holder element, said holder element at its slotted end having shoulders corresponding to the shoulders on the blade and being cut away at the leading face of the blade at each side whereby each edge of said blade on the leading side thereof is exposed to form a cutting edge, and the trailing side of the blade on both sides thereof is backed up by a shoulder on the holder element of substantial dimensions, each said shoulder on the holder element extending about 90° around the holder element and each shoulder on the holder element spiralling upwardly about the holder element away from the blade and the portions of the holder element between the shoulders thereon being cylindrical.

References Cited in the file of this patent

UNITED STATES PATENTS

| | | |
|---|---|---|
| 2,498,251 | Creel | Feb. 21, 1950 |
| 2,504,978 | Henning | Apr. 25, 1950 |
| 2,575,239 | Stephens | Nov. 13, 1951 |
| 2,607,562 | Phipps | Aug. 19, 1952 |
| 2,666,622 | Hawthorne | Jan. 19, 1954 |
| 2,673,714 | Hargrave | Mar. 30, 1954 |